Jan. 7, 1941.  H. NEALE  2,227,463
STORAGE BATTERY
Filed April 7, 1939
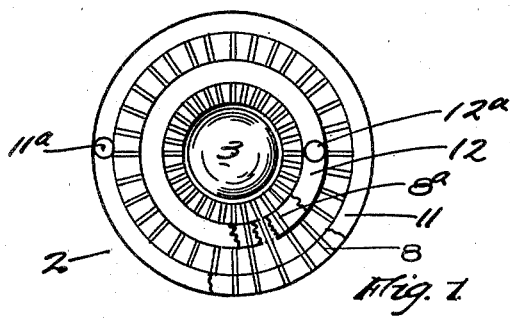
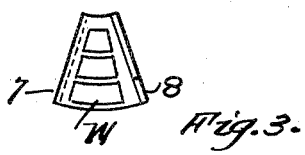
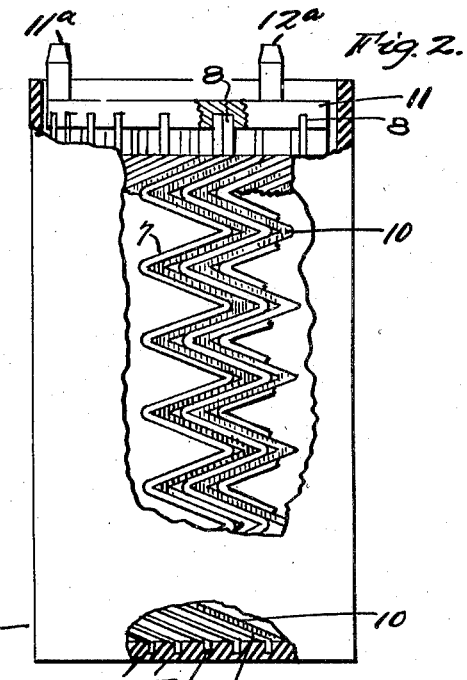
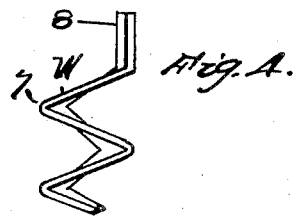
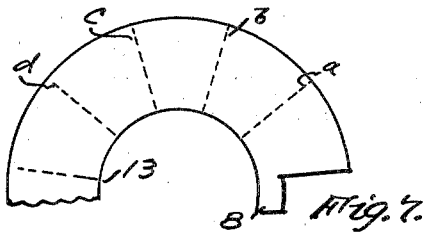
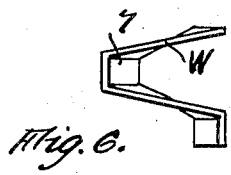
Inventor,
Herbert Neale;
By his Atty,
Frederick E. Maynard.

Patented Jan. 7, 1941

2,227,463

UNITED STATES PATENT OFFICE 2,227,463

STORAGE BATTERY

Herbert Neale, Los Angeles, Calif.

Application April 7, 1939, Serial No. 266,513

7 Claims. (Cl. 136—13)

This invention is a storage battery more particularly of the annular cell form.

Annular type storage batteries have been proposed but the manner of the arrangement of the two groups of negative and positive plates has not been such as to cause the general adoption of the cylindrical form cell; they entailed too much loss of cell space because of poor plate form and disposition.

It is an object of the present invention to provide a means and a method whereby to greatly increase the active surface area of the several plates of cylindrical storage batteries.

A further object is to provide a storage battery of cylindrical form and in which two groups are very compactly arranged in a cylindrical mass and are relatively angularly mutually nested with the opposite pole plates or electrodes in alternate situation in the cylinder.

A further object is to provide a battery plate grouping system of cylindric form and in which each plate is radially inserted and removable from the system, and to provide a battery plate which has a vertical attitude in the cell and has a length much greater than the cell height.

Noticeably, an object is to provide a cylindrical battery having two groups of electrode plates and each of which plates is of the same effective area as the others; in other words to provide two groups of equi-area plates, and provide two annular and identic-area groups, and in which all the plates are symmetrical, and all are of like radial and longitudinal form and arrangement.

A purpose of the invention is to provide a plate which is zig-zagged longitudinally to obtain great area in a prescribed cell height, and which is, in plan or end view, the segment of an annulus within a given cylindrical cell space.

The invention consists in certain advancements in this art as set forth in the ensuing disclosure and having, with the above, additional objects and advantages as hereinafter developed, and whose constructions, combinations, and details of means, and the method of manufacture, and the manner of operation will be made manifest in the description of the herewith illustrative embodiments; it being understood that modifications, variations and adaptations may be made within the spirit, scope and principle of the invention as it is more directly claimed hereinbelow.

Figure 1 is a top plan, partly in section, of the battery.

Figure 2 is a sectional elevation of the battery.

Figure 3 is a plan or end view of one of the grid or plate elements.

Figure 4 is an anterior, edge elevation of the upper end of a V-edge form of a plate.

Figure 5 is an anterior edge elevation of a curvilinear or sinuous edge form of plate.

Figure 6 is an anterior edge elevation of a U-edge form of plate.

Figure 7 is a plan in plane development, of a blank from which one of the zig-zag plates may be crimped.

The battery includes a preferably cylindrical cell box 2 of any desired material, and size, and thickness of wall, and may or may not have an axial core 3; the chamber of the box is therefore, in this form, circular. The bottom 4 of the box is provided with a system of equispaced slots 5 for the interlocking reception of short toes 6 of respective up-standing electrode plates or grids 7.

One of these plates is shown in Figs. 3 and 4 as being in end view of the form of a segment of an annulus of outside diameter to telescopically slide into a given box 2, and the plate being lengthwise of zig-zag form and height to end just below the top edge of the box for the usual tight sealing and filling-hole cap not necessary to here illustrate. It will be seen that this zigzag form provides a total-length plate area far greater than if the plate had plane sides. The lower end of each plate has a toe 6, mentioned above and each plate has a top terminal lug 8. The edge outline of the plate of Figs. 3 and 4 is of a series of alternately reversed V-forms and it is possible to laterally nest a large number of these plates in an annular system as is shown in Figs. 1 and 2.

When the plates 7 are assembled for installation in a box 2 they are suitably spaced from each other by insertion or formation of appropriate electrical insulators 10, Fig. 2, and the insulators or "separators" as they are called may take the form of thin, zig-zag strips or other equal function means.

The assembly of plates 7 is divided into two identical groups mutually interstaggered in annulus form, Fig. 1, each plate being radially disposed as to the axis of the box cell with adjac.nt plates deeply inter-nesting sidewise, Fig. 2.

One of the plates has its lugs 8 in a common circle to receive a bus-ring 11, while the other group of plates has top lugs 8a in another circle to receive an inner bus-ring 12, the rings having respective terminal posts 11a and 12a.

It will be seen that the lower ends of the several plates are held in fixed relation of assembly in the toe slots 5 of the box bottom, and that the upper ends of the plates are held fixed by the two bus-rings.

Figs. 5 and 6, show variants of edge, zig-zag contour of plates 7.

The zig-zag plates may be produced by various methods, and in Fig. 7 there is shown in plan, a segment of an annulus 13 of desired radial width between edges and when this is folded to and fro on fold lines $a$, $b$, $c$ and $d$, the webs will be of short segment form, Fig. 3, in plan while the plate will take a sinuous form lengthwise. The segmental form of each web W permits the assembly of all plates in a full, compact cylindrical mass fitting the cell of a complementary box 2. The diverging edges of the wedge features of the elements of this battery severally radiate from a common center of the circle about which they are disposed; in the illustrated case—the center, in plan, of a cylindric plate group.

What is claimed is:

1. A storage battery having an annular system of radial grid plates of zig-zag form, edgewise, and which nest in plan with side edges in parallel on lines radial to a common center.

2. A storage battery having a system of transversely corrugated radial, laterally inter-nesting plates having contiguous side edges of the folds substantially parallel and radial to the center of the system.

3. A battery plate consisting of a plurality of segmental webs which are successively, oppositely inclined and are connected one to the other along the converging sides of contiguous webs; the connecting line of folds being on the taper of the respective webs.

4. A storage battery having an annular system of two circular groups of radial plates of zig-zag edge form and compactly laterally internested peripherally in the system and presenting a train of symmetrical segments.

5. In a storage battery, a grid plate system including a plurality of corrugated elements each having radial, convergent ridges nested with the grooves of the contingous plate.

6. A battery plate presenting opposite, like corrugated faces and in which the successive surfaces from valley to ridge on each corrugation are each of segmental form and all have a common center of generation, the fold lines of the ridges and valleys being on the taper of the respective segments.

7. A battery having plates and separators each of which consists of a plurality of segmental webs which are successively, relatively oppositely inclined and are connected one to the other along the converging sides of contiguous webs, the lines of connection between the webs on the taper of the segments.

HERBERT NEALE.